(12) United States Patent
Tawara

(10) Patent No.: US 10,068,602 B2
(45) Date of Patent: Sep. 4, 2018

(54) METHOD FOR MANUFACTURING GLASS SUBSTRATE, METHOD FOR MANUFACTURING MAGNETIC DISK, AND POLISHING LIQUID COMPOSITION FOR GLASS SUBSTRATE

(71) Applicant: HOYA CORPORATION, Tokyo (JP)

(72) Inventor: Yoshihiro Tawara, Hokuto (JP)

(73) Assignee: HOYA CORPORATION, Tokyo (JP)

( * ) Notice: Subject to any disclaimer, the term of this patent is extended or adjusted under 35 U.S.C. 154(b) by 193 days.

(21) Appl. No.: 14/894,900

(22) PCT Filed: Jun. 29, 2014

(86) PCT No.: PCT/JP2014/067290
§ 371 (c)(1),
(2) Date: Nov. 30, 2015

(87) PCT Pub. No.: WO2014/208762
PCT Pub. Date: Dec. 31, 2014

(65) Prior Publication Data
US 2016/0118073 A1   Apr. 28, 2016

(30) Foreign Application Priority Data

Jun. 29, 2013   (JP) ................................. 2013-137631

(51) Int. Cl.
*C03C 15/02* (2006.01)
*G11B 5/84* (2006.01)
*C03C 19/00* (2006.01)
(Continued)

(52) U.S. Cl.
CPC .......... *G11B 5/8404* (2013.01); *B24B 37/044* (2013.01); *B24B 37/08* (2013.01);
(Continued)

(58) Field of Classification Search
CPC ............ C09K 3/14; B24B 37/04; C03C 19/00
See application file for complete search history.

(56) References Cited

U.S. PATENT DOCUMENTS

| 9,186,771 B2 | 11/2015 | Sakai et al. |
| 2002/0129559 A1* | 9/2002 | Ito .......................... B24B 37/044 51/307 |

(Continued)

FOREIGN PATENT DOCUMENTS

| CN | 1579706 A | 2/2005 |
| CN | 102737654 A | 10/2012 |

(Continued)

OTHER PUBLICATIONS

International Search Report in PCT/JP2014/067290 dated Oct. 7, 2014.

(Continued)

*Primary Examiner* — Timon Wanga

(57) ABSTRACT

The present invention provides a method for manufacturing a glass substrate for a magnetic disk or the like according to which surface roughnesses of main surfaces of a glass substrate can be reduced more than with currently available methods. In the present invention, by mirror-polishing (final finishing-polishing) the main surfaces of the glass substrate used in a magnetic disk, for example, using a polishing liquid containing organic-based particles made of a styrene-based resin, an acrylic resin, or a urethane-based resin, as polishing abrasive particles, surface roughnesses of the main surfaces of the substrate can be reduced more than with currently available methods.

18 Claims, 1 Drawing Sheet

(51) Int. Cl.

| | | |
|---|---|---|
| *C03C 23/00* | (2006.01) | |
| *G11B 5/73* | (2006.01) | |
| *B24B 37/04* | (2012.01) | |
| *B24B 37/08* | (2012.01) | |
| *C09K 3/14* | (2006.01) | |
| *G11B 5/62* | (2006.01) | |

(52) U.S. Cl.
CPC .............. *C03C 19/00* (2013.01); *C03C 23/00* (2013.01); *C09K 3/1409* (2013.01); *C09K 3/1454* (2013.01); *G11B 5/62* (2013.01); *G11B 5/73* (2013.01); *G11B 5/84* (2013.01); *C03C 15/02* (2013.01)

(56) References Cited

U.S. PATENT DOCUMENTS

| | | | | |
|---|---|---|---|---|
| 2008/0020679 | A1* | 1/2008 | Usui | B24B 37/042 451/36 |
| 2011/0204027 | A1* | 8/2011 | Moriya | B24B 37/015 216/53 |
| 2012/0251711 | A1* | 10/2012 | Sakai | B08B 3/04 427/128 |

FOREIGN PATENT DOCUMENTS

| | | |
|---|---|---|
| JP | 2006-82138 A | 3/2006 |
| JP | 2008-47271 A | 2/2008 |
| JP | 2011-136402 A | 7/2011 |
| JP | 2011-225436 A | 11/2011 |
| JP | 2012-11511 A | 1/2012 |
| JP | 2012-056073 A | 3/2012 |
| JP | 2012-121128 A | 6/2012 |
| JP | 2012121128 A * | 6/2012 |
| JP | 2012-212082 A | 11/2012 |
| JP | 2013-048263 A | 3/2013 |
| JP | 2013-89262 A | 5/2013 |
| WO | 02081584 A1 | 10/2002 |
| WO | 2013/065491 A1 | 5/2013 |

OTHER PUBLICATIONS

Office Action translated into Japanese in the corresponding Chinese Patent Application No. 201480024238.6 dated Aug. 2, 2017.
Written Opinion translated into Japanese in the corresponding Chinese Patent Application No. 201480024238.6.

* cited by examiner

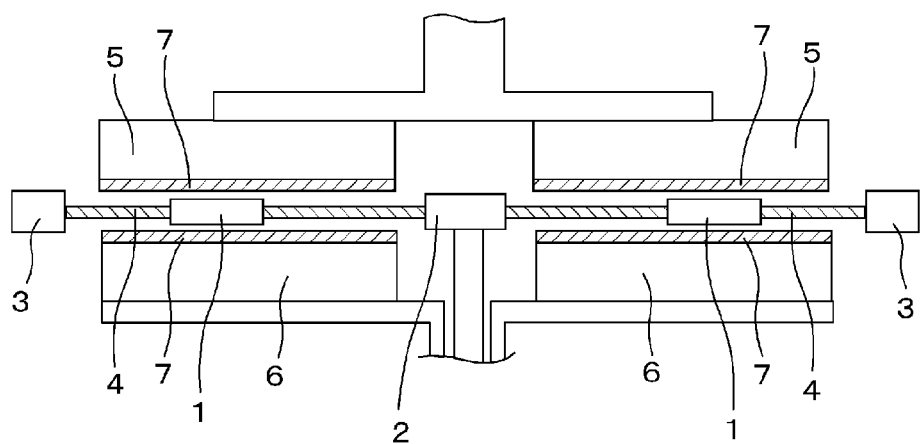

METHOD FOR MANUFACTURING GLASS SUBSTRATE, METHOD FOR MANUFACTURING MAGNETIC DISK, AND POLISHING LIQUID COMPOSITION FOR GLASS SUBSTRATE

CROSS-REFERENCE TO RELATED APPLICATIONS

This U.S. National stage application of International Patent Application No. PCT/JP2014/067290, filed on Jun. 29, 2014, which, in turn, claims priority under 35 U.S.C. § 119(a) to Japanese Patent Application No. 2013-137631, filed in Japan on Jun. 29, 2013, the entire contents of which are hereby incorporated herein by reference.

BACKGROUND

Field of the Invention

The present invention relates to a method for manufacturing a glass substrate, and a method for manufacturing a magnetic disk, which are applied to manufacture a magnetic-disk glass substrate used in a magnetic disk provided in magnetic recording devices such as hard disk drives (abbreviated as "HDDs" hereinafter) and the like, and a glass substrate for a mask blank, which is an original plate for manufacturing a photomask used to manufacture a semiconductor device such as a LSI with a photolithography method, and a polishing liquid composition for a glass substrate.

Background Information

Magnetic disks are one type of information recording medium provided in magnetic recording devices such as HDDs. Magnetic disks are configured with a thin film such as a magnetic layer formed on a substrate, and conventionally an aluminum substrate has been used as the substrate. However, recently, in response to the pursuit of high recording density, glass substrates with which the gap between the magnetic head and the magnetic disk can be made narrower than with aluminum substrates have been increasingly used. The glass substrate surface is precisely polished such that the flying height of the magnetic head can be lowered as much as possible to achieve a high recording density. In recent years, demand for HDDs with a larger storage capacity at lower cost has been increasing, and in order to achieve this, further quality improvement of magnetic-disk glass substrates and cost reduction are also required.

As described above, it is essential for a magnetic disk to have a highly smooth surface to achieve the low flying height that is necessary for achieving a high recording density. In order to attain a highly smooth magnetic disk surface, a highly smooth substrate surface is ultimately required, and thus it is necessary to precisely polish the surface of the glass substrate.

A conventional method for polishing a glass substrate involves polishing a glass substrate using a polishing pad with a polisher made of polyurethane or the like while supplying a slurry (polishing liquid) containing an abrasive of a metal oxide such as cerium oxide or colloidal silica. A highly smooth glass substrate can be obtained by additionally performing finishing-polishing (mirror polishing) using colloidal silica abrasive particles after performing polishing using a cerium oxide-based abrasive.

SUMMARY

Although currently available HDDs can store about 320 gigabytes of information per 2.5-inch (diameter of 65 mm) magnetic disk, for example, there is demand for a further increase in recording density, such as the realization of 750 gigabytes, or even 1 terabyte, for example. Following such demand for HDDs with a larger storage capacity in recent years, the need for improvement in the surface quality of a substrate is greater than ever. Next-generation substrates for magnetic disks of 750 gigabytes, for example, such as those described above will greatly influence the reliability of HDDs, and thus a further improvement from currently available HDDs is required, also in terms of the surface roughness of the substrate.

Next-generation substrates will greatly influence the reliability of HDDs for reasons such as the following.

A significant reduction is achieved in the flying height (the gap between the magnetic head and the surface of medium (magnetic disk)) of a magnetic head (lower flying height). This reduces the distance between the magnetic head and the magnetic layer of the medium, which makes it possible to write signals to a smaller region and pick up signals of smaller magnetic particles, and hence a high recording density is achieved. In recent years, magnetic heads have been provided with a function called DFH (Dynamic Flying Height) control. This function causes only the recording and reproduction element portion of the magnetic head to protrude toward (approach) the medium surface by utilizing thermal expansion of a heating unit such as a heater incorporated in the vicinity of the recording and reproduction element portion, instead of lowering the flying height of a slider. Under such circumstances, in order to realize a lower flying height of the magnetic head, it is necessary to achieve high smoothness of the glass substrate surface.

Incidentally, in conventional technology, a method for making the particle diameter of polishing abrasive particles used in a polishing step smaller is well known as a method for reducing the roughness of the main surface of the glass substrate.

However, according to studies conducted by the inventors of the present invention, in the case of colloidal silica abrasive particles used to perform conventional finishing-polishing, for example, even if colloidal silica abrasive particles having an average particle diameter of 10 nm or less are used, the trend of decreasing roughness of the glass surface after polishing is no longer observed. It is inferred that the polishing abrasive particles are present between the glass surface and the polishing pad at the time of polishing, and the polishing pad is pressed against the glass surface with a predetermined load, and therefore the minute abrasive particles sink into the polishing pad, resulting in a reduction in a protruding amount that contributes to polishing and a significant reduction in the grinding amount, as a result of which the effect of reducing surface roughness through polishing cannot be obtained.

It should be noted that JP 2011-136402A above discloses that use of composite particles (heteroaggregate) of organic-based particles and inorganic particles having a size equivalent to or greater than that of the organic-based particles as the polishing abrasive particles suppresses the occurrence of scratches.

However, with the polishing abrasive particles disclosed in JP 2011-136402A above, inorganic particles such as silica particles, for example, are thought to substantially exhibit the action of polishing glass, and even if polishing processing is performed with such polishing abrasive particles, it is difficult to resolve the conventional problem fundamentally. For example, separation of silica particles from the composite particles during polishing processing causes a phenomenon similar to the case where polishing is performed through silica polishing alone.

In short, in the case where attempts are made to manufacture next-generation substrates for magnetic disks of 750 gigabytes, for example, a further improvement from currently available HDDs is required, also in terms of the roughness of the substrate surface, and if a surface roughness Ra needs to be 0.1 nm or less, for example, there is a limit to reducing the roughness simply by using a roughness improvement method by means of the conventional technology, and it is absolutely difficult to develop next-generation substrates as described above.

Also, a photomask is used to manufacture a semiconductor device such as LSI with a photolithography method, and in order to realize high-precision transfer of a pattern to a semiconductor substrate, a glass substrate for a mask blank used to manufacture the photomask also needs a further improvement in roughness of the substrate surface.

In view of this, the present invention has been made to resolve such conventional issues, and an object thereof is firstly to provide a method for manufacturing a high-quality magnetic-disk glass substrate with which the surface roughness of a main surface of the glass substrate can be reduced more than with currently available methods, for example, secondly to provide a method for manufacturing a magnetic disk using the above-described glass substrate, and thirdly to provide a polishing liquid composition for a glass substrate that can be applied to the above-described method for manufacturing a glass substrate.

Solution to Problem

In view of this, in order to obtain a glass substrate whose surface roughness is reduced more than in currently available glass substrates, the inventor of the present invention has studied a method according to which surface roughness of a glass substrate is reduced in a polishing step, but the surface roughness of the glass substrate is not increased in a cleaning step after polishing. As a result of the studies, the inventor found that use of organic-based particles as the polishing abrasive particles could resolve the above-described issues.

That is, it is conceivable that use of organic-based particles having a hardness lower than that of glass advances polishing without forming a processing altered layer on the glass surface in the polishing step with a load applied, and therefore it was found that selection of a cleaning liquid with which the roughness of a glass substrate surface after polishing can be suppressed and that does not have etching action on glass can suppress an increase in roughness of a glass substrate surface after cleaning, as a result of which it is possible to achieve a surface roughness Ra of 0.1 nm or less, for example, which is required for next-generation substrates.

Based on the above-described findings, the inventor of the present invention found that the above-described issues can be resolved according to the invention having the following aspects, thus accomplishing the invention.

That is, in order to achieve the above-described objects, the present invention has the following aspects.

(Aspect 1)
A method for manufacturing a glass substrate, including polishing processing for mirror-polishing main surfaces of a glass substrate, in which the main surfaces of the glass substrate are mirror-polished using a polishing liquid containing organic-based particles as polishing abrasive particles.

(Aspect 2)
The method for manufacturing a glass substrate according to Aspect 1, in which the organic-based particles are made of a styrene-based resin, an acryl-based resin, or a urethane-based resin.

(Aspect 3) The method for manufacturing a glass substrate according to Aspect 1 or 2, in which a particle diameter of the organic-based particles is in a range of 0.5 to 60 μm.

(Aspect 4)
The method for manufacturing a glass substrate according to any of Aspects 1 to 3, in which after the main surfaces of the glass substrate are polished using a polishing liquid containing silica abrasive particles as polishing abrasive particles, the main surfaces of the glass substrate are mirror-polished using the polishing liquid containing the organic-based particles as polishing abrasive particles.

(Aspect 5)
The method for manufacturing a glass substrate according to any of Aspects 1 to 4, in which with regard to roughnesses of the main surfaces of the glass substrate before the main surfaces of the glass substrate are mirror-polished using the polishing liquid containing the organic-based particles as polishing abrasive particles, an arithmetic mean roughness Ra is 0.3 nm or less.

(Aspect 6)
The method for manufacturing a glass substrate according to any of Aspects 1 to 5, in which after the main surfaces of the glass substrate are mirror-polished using the polishing liquid containing the organic-based particles as polishing abrasive particles, the glass substrate is cleaned using an alcohol-based cleaning agent.

(Aspect 7)
The method for manufacturing a glass substrate according to any of Aspects 1 to 6, in which the glass substrate is a magnetic-disk glass substrate.

(Aspect 8)
The method for manufacturing a glass substrate according to any of Aspects 1 to 6, in which the glass substrate is a glass substrate for a mask blank.

(Aspect 9)
A method for manufacturing a magnetic disk, in which at least a magnetic layer is formed on a magnetic-disk glass substrate that is obtained with the manufacturing method according to Aspect 7.

(Aspect 10)
A polishing liquid composition for a glass substrate, which is to be applied in polishing processing for polishing surfaces of a glass substrate, the polishing liquid composition containing organic-based particles as polishing abrasive particles.

(Aspect 11)
The polishing liquid composition for a glass substrate according to Aspect 10, in which a particle diameter of the organic-based particles is in a range of 0.5 to 60 μm.

With the above-described aspects of the present invention, it is possible to manufacture a high-quality glass substrate with which the surface roughness of the main surface of the glass substrate can be reduced more than with currently available substrates.

Also, with the above-described aspects of the present invention, it is possible to manufacture a high-quality glass substrate favorable for manufacturing a magnetic disk having a higher recording density than previously available, such as a recording density exceeding 750 gigabytes.

Also, use of the above-described glass substrate makes it possible to manufacture a magnetic disk having a higher recording density as described above.

Also, according to the present invention, it is possible to provide a polishing liquid composition for a glass substrate that can be applied to the method for manufacturing a glass substrate.

BRIEF DESCRIPTION OF THE DRAWINGS

FIG. 1 is a longitudinal cross-sectional view of a schematic configuration of a double-side polishing device.

DESCRIPTION OF EMBODIMENTS

Hereinafter, an embodiment according to the present invention will be described in detail.

Magnetic-disk glass substrates are usually manufactured through a grinding step, a shape processing step, an edge surface polishing step, a main surface polishing step, a chemical strengthening step, and the like.

The magnetic-disk glass substrate is manufactured by first molding a disk-shaped glass substrate (glass disk) from molten glass by direct pressing. It should be noted that a glass substrate may be obtained by cutting plate glass manufactured with a downdraw method or a float method other than using direct pressing into a predetermined size. Next, grinding (lapping) for enhancing the dimensional accuracy and shape accuracy is performed on main surfaces of this molded glass substrate. In this grinding step, a double-side lapping device is generally used to grind the main surfaces of the glass substrate with hard abrasive particles such as diamond particles. By grinding the main surfaces of the glass substrate in this manner, the glass substrate is processed so as to have a predetermined substrate thickness and flatness and to obtain a predetermined surface roughness.

After this grinding step ends, the shape processing step and the edge surface polishing step are performed, and the mirror-polishing processing for obtaining a high precision flat surface is then performed. Conventionally, a method for mirror-polishing a glass substrate was performed using a polishing pad made of polyurethane foam or the like while supplying a slurry (polishing liquid) containing an abrasive that is made of a metal oxide such cerium oxide or colloidal silica.

As described above, the inventor found that when attempts were made to manufacture a magnetic disk having a higher recording density than previously available, such as a recording density exceeding 750 gigabytes, for example, it was necessary to reduce the roughness of the substrate surface to less than that of currently available substrates, for example, which can be a factor inhibiting the realization of a further lowering of the flying height by adoption of a magnetic head provided with the above-described DFH control function, for example, and in order to achieve this, a polishing liquid composition containing organic-based particles as polishing abrasive particles is preferable as a polishing liquid that is used in polishing processing.

An embodiment of the present invention is a polishing liquid composition for a glass substrate that is applied in polishing processing for polishing main surfaces of a glass substrate used in a magnetic disk, for example, and the composition contains organic-based particles as polishing abrasive particles.

That is, it is conceivable that by using organic-based particles having a lower hardness and a higher elasticity than glass as polishing abrasive particles, polishing advances without forming a processing altered layer on the glass surface in a polishing step with a load applied, and therefore roughness of the surface of a glass substrate that has been polished can be reduced. Moreover, in a cleaning step for removing abrasive particles adhering to the surface of the glass substrate after polishing, a cleaning liquid that does not have etching action on glass is selected so as to perform cleaning, and therefore an increase in roughness of the surface of the glass substrate after cleaning can be suppressed.

In addition, by performing processing for polishing a glass substrate using a polishing liquid constituted by a polishing liquid composition for a glass substrate that contains organic-based particles according to the present invention as polishing abrasive particles, with regard to the surface roughnesses of the surfaces of the glass substrate, for example, an arithmetic mean roughness Ra can be reduced to 0.1 nm or less, which needs to be satisfied by next-generation substrates, and a high-quality glass substrate can be manufactured. Therefore, in the case of manufacturing a magnetic disk having a higher recording density than previously available, such as a recording density exceeding 750 gigabytes, for example, it is possible to manufacture a high-quality glass substrate that is favorable for the realization of a further lowering of the flying height to a lower flying height than previously available. In short, in the present invention, processing for polishing main surfaces of a glass substrate using a polishing liquid containing organic-based particles as polishing abrasive particles is, in other words, processing for reducing the roughness of the surface of the glass substrate.

A polishing liquid composition for a glass substrate according to the present invention that is applied in the mirror-polishing processing contains an abrasive (polishing abrasive particles) and water, which is a solvent, in combination, and also contains a pH adjusting agent for adjusting the pH of the polishing liquid and other additive agents as required.

In the present invention, the above-described polishing liquid composition contains organic-based particles as polishing abrasive particles. Also, the present invention is characterized by usage of only organic-based particles as polishing abrasive particles. The organic-based particles are particles made of an organic material such as a resin, and more specifically, are particles made of an elastic resin having a lower hardness than that of glass. Specifically, it is preferable that the material of organic-based particles is a resin material such as an acryl-based resin, urethane-based resin, or styrene-based resin. The acryl-based resin is a polymer obtained by the polymerization of acrylic monomer (polymethyl methacrylate (PMMA), for example), a copolymer including acrylic monomers as a main component, or the like. Also, the urethane-based resin is a urethane resin obtained by the polymerization of urethane monomers, a copolymer including urethane monomers as a main component, or the like. Also, the styrene-based resin is a styrene resin obtained by the polymerization of styrene monomers, a copolymer including styrene monomers as a main component, or the like. Among these, in particular, the organic-based particles are preferably made of the acrylic resin or the urethane-based resin, because such organic-based particles have a good dispersiveness into water and are easily made into a slurry.

In order to rotate a surface plate with a load applied, the organic-based particles needs to have a low friction, and therefore the shape of the organic-based particles is preferably spherical, and resin beads having the same particle diameter are desirable.

It should be noted that the above-described organic-based particles may be a copolymer obtained by the polymerization of a plurality of types of monomers. For example, two or more of an acrylic monomer, a urethane monomer, and a styrene monomer may be selected so as to perform polymerization. Also, various organic-based particles may be mixed.

It is preferable to use the above-described organic-based particles having a particle diameter of 0.5 to 60 μm. If the particle diameter is less than 0.5 μm, it is difficult to obtain the effect of reducing the surface roughness of a glass substrate. Also, if the particle diameter exceeds 60 μm, the viscosity of a polishing liquid increases, and it is difficult to obtain a good effect of reducing the surface roughness.

In the present invention, in order to achieve a greater reduction in surface roughness, it is preferable to use the organic-based particles having a particle diameter of 1.5 to 30 μm, and more preferably having a particle diameter of 10 to 25 μm.

It should be noted that in the case where the polishing liquid contains very small organic particles having a particle diameter of 0.1 μm or less, or a macromolecular compound such as a water-soluble macromolecule, the macromolecular compound is likely to be adsorbed and remain on the glass substrate surface, and therefore it will be difficult to obtain a clean surface after cleaning processing, which is not preferable. The particle diameter of organic-based particles included in the polishing liquid of the present invention is approximately 20 times the particle diameter (25 nm, for example) of polishing abrasive particles such as colloidal silica used in final polishing performed on the main surfaces of a substrate in recent years, and therefore the organic-based particles are easily removed in the cleaning processing, and a clean substrate surface can be easily obtained in final cleaning.

It should be noted that in the present invention, the particle diameter of the above-described organic-based particles is obtained by observing particles with a scanning electron microscope (SEM), selecting 100 particles, measuring the maximum sizes of the 100 particles, and finding an arithmetic mean value thereof.

Also, although there is no particular limitation on the concentration of abrasive particles in the polishing liquid, from the point of view of surface quality after polishing and polishing time, the concentration of abrasive particles can be set in a range of 0.1 to 5 wt %. In particular, a range of 1 to 3 wt % is preferable. If the concentration of abrasive particles is too high, there are cases where the time for cleaning processing after polishing is extended and the productivity decreases.

Also, from the point of view of reducing scratches caused by sticking of a resin due to dryness, a polishing liquid composition for a glass substrate of the present invention may contain at least one type of additive agent selected from a material exhibiting a lubricating effect and a material exhibiting a moisturizing effect.

A specific example of such an additive agent is at least one selected from the group consisting of glycols (ethylene glycol, propylene glycol, and hexylene glycol), amines (monoethanolamine, diethanolamine, triethanolamine, and isopropanolamine), carboxylic acids, mineral oils, water-soluble oil emulsions, polyethylenimine, boric acid, amides, triazines, benzothiazole, benzotriazole, ethers, and the like.

Although there is no particular limitation on the addition amount of the above-described additive agent, but from the point of view of reducing scratches and processing time, it is preferable that the addition amount thereof is in a range of 0.01 to 1 wt %.

Also, the above-described polishing liquid composition whose pH is adjusted to 4 to 8, for example, is preferably used. If the pH is less than 4, corrosion of resin abrasive particles is a concern. Also, if the pH exceeds 8, the cleaning properties after polishing decrease and foreign matter defects are likely to occur.

There is no particular limitation on the polishing method in polishing processing using a polishing liquid constituted by a polishing liquid composition containing organic-based particles of the present invention as polishing abrasive particles of the present invention, and similarly to the conventional method, it is sufficient that surfaces of a glass substrate are polished to have mirror surfaces by bringing the glass substrate and polishing pads into contact with each other, and moving the polishing pads and the glass substrate relative to each other while supplying the polishing liquid containing polishing abrasive particles of the organic-based particles, for example. As the polishing pad, it is possible to apply a polishing pad that is similar to the polishing pad made of polyurethane foam, for example, which is applied in mirror-polishing processing in which the conventional colloidal silica abrasive particles are used. However, in the mirror-polishing processing using the polishing abrasive particles of organic-based particles of the present invention, there is no limitation on the hardness of the polishing pad, unlike with the silica abrasive particles. This is because the resin abrasive particles themselves have cushioning properties.

For example, FIG. 1 is a longitudinal cross-sectional view showing a schematic configuration of a planetary double-side polishing device that can be used in the step of mirror-polishing a glass substrate. The double-side polishing device shown in FIG. 1 includes a sun gear 2, an internal gear 3 arranged concentrically on the outside of the sun gear 2, a carrier 4 that is engaged with the sun gear 2 and the internal gear 3 and revolves and rotates in response to the rotation of the sun gear 2 or the internal gear 3, an upper surface plate 5 and a lower surface plate 6 to which polishing pads 7 that are capable of holding a product 1 to be polished that is held by the carrier 4 are respectively attached, and a polishing liquid supplying portion (not shown) that supplies the polishing liquid between the upper surface plate 5 and the lower surface plate 6.

At the time of polishing processing, by using such a double-side polishing device, the product 1 to be polished, that is, the glass substrate, which is held by the carrier 4, is held between the upper surface plate 5 and the lower surface plate 6, and then both the upper and lower surfaces of the product 1 to be polished are polished while the polishing liquid constituted by the polishing liquid composition of the present invention is supplied between the polishing pads 7 of the upper and lower surface plates 5 and 6 and the product 1 to be polished, and the carrier 4 revolves and rotates in response to the rotation of the sun gear 2 and the internal gear 3.

It should be noted that it is preferable to apply the load (processing surface pressure) in a range of 50 gf/cm$^2$ or more to 200 gf/cm$^2$ or less. A load of less than 50 gf/cm$^2$ is not preferable because the processability (polishing rate) of the glass substrate is reduced. Also, a load of more than 200 gf/cm$^2$ is not preferable because processing becomes unstable.

By using the polishing liquid constituted by the polishing liquid composition of the present invention and polishing main surfaces of a glass substrate at the processing surface pressure in the above-described range, the surface roughness can be further reduced.

In general, conventionally, the step of mirror-polishing the main surfaces of a glass substrate is performed over two stages, namely the first polishing step for removing marks and distortion remaining from the lapping step and the finishing-polishing step for finishing the surface roughnesses of the main surfaces of the glass substrate into a smooth mirror surface while maintaining flat surfaces obtained in this first polishing step, but in the present invention, final finishing-polishing, in which a polishing liquid constituted by a polishing liquid composition containing organic particles of the present invention as polishing abrasive particles is applied, is preferably performed after this finishing-polishing step.

Although the above-described conventional finishing-polishing step is usually performed using colloidal silica abrasive particles having an average particle diameter of about 15 to 40 nm, a further reduction in surface roughness can be achieved by performing final finishing-polishing in which a polishing liquid constituted by a polishing liquid composition containing the organic-based particles of the present invention as polishing abrasive particles is applied, after conventional finishing-polishing. As described before, if final finishing-polishing is performed using colloidal silica abrasive particles with particle diameters smaller than the above-described particle diameter, it is difficult to further reduce the surface roughness. It should be noted that the average particle diameter of colloidal silica abrasive particles denotes a particle diameter at which a cumulative curve reaches 50% when the cumulative curve is derived by setting the total volume of powder particles in the particle size distribution measured by a light scattering method to 100% (referred to as "cumulative average particle diameter (50% diameter)" and is abbreviated to "D50" hereinafter). Specifically, the cumulative average particle diameter is a value obtained by measuring the particle diameter using a particle diameter/particle size distribution measurement device.

As described above, it is preferable that after main surfaces of the glass substrate are polished using a polishing liquid containing colloidal silica abrasive particles as polishing abrasive particles, the main surfaces of the glass substrate are mirror-polished using a polishing liquid containing organic-based particles of the present invention as polishing abrasive particles. In other words, it is preferable to mirror-polish the main surfaces of a glass substrate having a processing altered layer, using a polishing liquid containing the organic-based particles of the present invention as polishing abrasive particles.

With regard to roughness of a main surface of a glass substrate before the main surface of the glass substrate is mirror-polished using a polishing liquid containing the organic-based particles of the present invention as polishing abrasive particles, if the arithmetic mean roughness Ra is 0.3 nm or less, it is possible to further reduce surface roughness of the substrate in a relatively short processing time through polishing processing using the organic-based particles of the present invention as polishing abrasive particles, and to finish the main surface to an Ra of 0.1 nm or less, for example. That is, from the point of view of processing time (productivity), with regard to roughnesses of the main surfaces of a glass substrate before the main surfaces of the glass substrate are mirror-polished using a polishing liquid containing the organic-based particles of the present invention as polishing abrasive particles, the arithmetic mean roughness Ra is preferably 0.3 nm or less, and more preferably 0.2 nm or less.

Incidentally, after polishing processing using abrasive particles, cleaning for removing abrasive particles adhering to the surfaces of the glass substrate is performed, and alkaline cleaning is usually performed in cleaning for removing inorganic abrasive particles such as colloidal silica and the like. Alkaline components have the effect of etching glass, and therefore, conventionally, it has been confirmed that roughness of the surface of a glass substrate that has undergone cleaning increases. In particular, since colloidal silica has a composition similar to that of glass, both colloidal silica and glass have high affinity and colloidal silica is likely to stick to the glass surface after polishing processing, and therefore it is preferable to perform cleaning using an alkaline cleaning liquid having the power to etch glass.

It is conceivable that in particular, colloidal silica has a hardness that is approximately same as that of glass, and therefore a processing altered layer is formed on the glass surface in polishing processing using colloidal silica as abrasive particles, as a result of which the etching action of alkaline components on this processing altered layer also plays a role in increasing roughness of a glass surface. Although it is possible to suppress the formation of a processing altered layer by reducing the size of the abrasive particles, for example, as described above, if the size of the abrasive particles is reduced, the effect of reducing surface roughness through polishing cannot be obtained as well.

On the other hand, after the main surfaces of a glass substrate are mirror-polished using a polishing liquid containing the organic-based particles of the present invention as polishing abrasive particles, in the case where cleaning for removing abrasive particles adhering to the surfaces of the glass substrate is performed, it is preferable to clean the glass substrate using an organic solvent such as an alcohol-based cleaning agent, for example. An organic solvent such as an alcohol-based cleaning agent, for example, has a property of permeating organic-based particles, and therefore can favorably dissolve and remove the organic-based particles and does not have etching action on glass at all. That is, it is possible to select a cleaning liquid that does not have etching action on glass and perform cleaning, and therefore an increase in the roughnesses of surfaces of a glass substrate that has undergone cleaning can be suppressed. Therefore, after cleaning, very low roughness (high smoothness) obtained by mirror-polishing processing in which organic-based particles are applied as polishing abrasive particles can be maintained as-is.

At least one selected from the group consisting of aliphatic ethers (e.g., isopropyl ether and dibutyl ether), ketones (e.g., methyl ethyl ketone), carboxylic acid esters (e.g., ethyl acrylate), aliphatic esters, aromatic esters (e.g., benzene, phenol, and cresol), acetate esters (e.g., methyl acetate, isopropyl acetate, and butyl acetate), nitrogen compounds (e.g., pyrrole, aniline, ethylenediamine, and picric acid), chloride compounds (e.g., chloromethane, monochlorobenzene, chloroform, and tetrachloroethane), cyclohexane, furan, acetone, and ethylene oxide, as well as the above-described alcohols (e.g., methanol and ethanol), may be used as a cleaning agent preferable for the organic-based particles of the present invention.

In the present invention, it is preferable that the (type of) glass constituting the glass substrate is aluminosilicate glass containing $SiO_2$ as a main component and alumina. Mirror-polishing the surfaces of a glass substrate made of such glass can yield smooth mirror-finished surfaces, and the post-processing strength is favorable. Also, the strength can be increased by chemical strengthening.

Also, the above-described glass may be crystallized glass or amorphous glass. Using amorphous glass to prepare a glass substrate can further reduce surface roughnesses of main surfaces of the glass substrate.

Aluminosilicate glass containing $SiO_2$ in an amount of 58 wt % or more to 75 wt % or less, $Al_2O_3$ in an amount of 5 wt % or more to 23 wt % or less, $Li_2O$ in an amount of 3 wt % or more to 10 wt % or less, and $Na_2O$ in an amount of 4 wt % or more to 13 wt % or less as main components (i.e., aluminosilicate glass that does not contain phosphorus oxide) can be used as such aluminosilicate glass. Furthermore, it is possible to use phosphorus oxide-free amorphous aluminosilicate glass that contains an oxide of an alkaline earth metal in an amount of 5 wt % or more and, as main components, $SiO_2$ in an amount of 62 wt % or more to 75 wt % or less, $Al_2O_3$ in an amount of 5 wt % or more to 15 wt % or less, $Li_2O$ in an amount of 4 wt % or more to 10 wt % or less, $Na_2O$ in an amount of 4 wt % or more to 12 wt % or less, and $ZrO_2$ in an amount of 5.5 wt % or more to 15 wt % or less, and has an $Na_2O/ZrO_2$ weight ratio of 0.5 or more to 2.0 or less and an $Al_2O_3/ZrO_2$ weight ratio of 0.4 or more to 2.5 or less, for example.

In addition, there are cases in which heat resistance is required as a characteristic of a next-generation substrate (substrate that is used in a magnetic disk applicable to a thermally assisted magnetic recording method, for example). As heat resistant glass in this case, it is preferable to use, for example, glass that contains an oxide of an alkaline earth metal in an amount of 5 wt % or more and $SiO_2$ in an amount of 50 to 75 mol %, $Al_2O_3$ in an amount of 0 to 6 mol %, BaO in an amount of 0 to 2 mol %, $Li_2O$ in an amount of 0 to 3 mol %, ZnO in an amount of 0 to 5 mol %, $Na_2O$ and $K_2O$ in a total amount of 3 to 15 mol %, MgO, CaO, SrO and BaO in a total amount of 14 to 35 mol %, and $ZrO_2$, $TiO_2$, $La_2O_3$, $Y_2O_3$, $Yb_2O_3$, $Ta_2O_5$, $Nb_2O_5$ and $HfO_2$ in a total amount of 2 to 9 mol %, and that has a molar ratio $[(MgO+CaO)/(MgO+CaO+SrO+BaO)]$ in a range of 0.85 to 1 and a molar ratio $[Al_2O_3/(MgO+CaO)]$ in a range of 0 to 0.30.

Also, it is preferable to use quartz as glass for a mask blank substrate.

In the present invention, the surface of the glass substrate that has undergone the final finishing-polishing processing in which the organic-based abrasive particles of the present invention are applied is preferably a mirror surface having an arithmetic mean roughness Ra of 0.1 nm or less, and in particular a mirror surface having an arithmetic mean roughness Ra of 0.09 nm or less. Furthermore, the surface of the glass substrate is a mirror surface that preferably has a maximum peak height Rp of 1.0 nm or less, and more preferably has a maximum peak height Rp of 0.6 nm or less. It should be noted that Ra and Rp of the present invention refer to roughness calculated in conformity with Japanese Industrial Standard (JIS) B0601.

The surface roughness in the present invention is the surface roughness of a surface shape that is measured using an atomic force microscope (AFM) in a 1 μm×1 μm range at a resolution of 256×256 pixels.

In the present invention, it is preferable to perform chemical strengthening before or after the mirror-polishing processing step. As a method for the chemical strengthening, it is preferable to use, for example, a low-temperature ion-exchange method in which ion exchange is performed in a temperature range not exceeding the glass transition point, at a temperature of 300° C. or more to 400° C. or less, for example. The chemical strengthening is processing in which the glass substrate is brought into contact with a molten chemical strengthening salt so that an alkali metal element having a relatively large atomic radius in the chemical strengthening salt and an alkali metal element having a relatively small atomic radius in the glass substrate are ion-exchanged, whereby the alkali metal element having a relatively large atomic radius permeates through the surface layer of the glass substrate, and compressive stress is generated on the surfaces of the glass substrate. A glass substrate that has undergone the chemical strengthening has excellent impact resistance, and therefore it is particularly preferable to mount the glass substrate in an HDD for mobile use, for example. An alkali metal nitrate such as potassium nitrate or sodium nitrate can be preferably used as the chemical strengthening salt.

As described above, the magnetic-disk glass substrate that is manufactured according to the present invention is favorable for a glass substrate that is used in a magnetic disk provided in a HDD provided with a DFH magnetic head that can realize an extremely low flying height.

In addition, the present invention provides a method for manufacturing a magnetic disk using the above-described magnetic-disk glass substrate. The magnetic disk is manufactured by forming at least a magnetic layer on the magnetic-disk glass substrate according to the present invention. A hexagonal-system CoCrPt-based or CoPt-based ferromagnetic alloy with a large anisotropic magnetic field can be used as a material of the magnetic layer. It is preferable to form the magnetic layer on the glass substrate by a sputtering method such as a DC magnetron sputtering method. Interposing a base layer between the glass substrate and the magnetic layer makes it possible to control the orientation direction and size of magnetic particles in the magnetic layer. For example, use of a cubic-system base layer made of Cr-based alloy or the like makes it possible to orient, for example, the direction of easy magnetization of the magnetic layer along the magnetic disk surface. In this case, a longitudinal magnetic recording type magnetic disk is manufactured. In addition, for example, use of a hexagonal-system base layer containing Ru and Ti makes it possible to orient, for example, the direction of easy magnetization of the magnetic layer along the normal of the plane of the magnetic disk. In this case, a perpendicular magnetic recording type magnetic disk is manufactured. The base layer can be formed by a sputtering method in the same manner as the magnetic layer.

It is preferable to form a protective layer and a lubricant layer in this order on the magnetic layer. An amorphous hydrogenated carbon-based protective layer is preferable as the protective layer. The protective layer can be formed by a plasma CVD method, for example. As the lubricant layer, a lubricant that has a functional group at the terminal of the main chain of a perfluoropolyether compound can be used. In particular, it is preferable that the lubricant contains, as a main component, a perfluoropolyether compound that has a hydroxyl group as a polar functional group at the terminal. The lubricant layer can be applied and formed by a dipping method.

Use of a highly smooth glass substrate obtained according to the present invention makes it possible to obtain a highly reliable magnetic disk in which problems such as recording and reproduction errors and head crash do not occur even when recording and reproduction are performed using a DFH head. Therefore, the present invention is favorable for manufacturing a magnetic disk having a higher recording density than previously available, such as a recording density exceeding 500 gigabytes, for example.

Although the case where the present invention is mainly applied to processing for polishing a magnetic-disk glass substrate has been described in the above-described embodiment, the case where the present invention is applied to processing for polishing a glass substrate for a mask blank is similar thereto.

WORKING EXAMPLES

Hereinafter, the embodiment of the present invention will be described in detail by way of working examples. It should be noted that the present invention is not limited to the following working examples.

Working Examples 1 to 3, Comparative Examples 1 and 2

A magnetic-disk glass substrate was manufactured through (1) a rough lapping step (rough grinding step), (2) a shape processing step, (3) a precision lapping step (precision grinding step), (4) an edge surface polishing step, (5) a main surface polishing step, (6) a chemical strengthening step, (7) a main surface finishing-polishing step, and (8) a main surface final finishing-polishing step, that will be described below.

(1) Rough Lapping Step

First, a disk-shaped glass substrate made of aluminosilicate glass and having a diameter of 66 mmφ and a thickness of 1.0 mm was obtained from molten glass by direct pressing using upper, lower, and drum molds. It should be noted that a glass substrate may be obtained by cutting plate glass manufactured with a downdraw method or a float method other than using direct pressing into a predetermined size.

Next, in order to improve dimensional accuracy and shape accuracy, the lapping step was performed on this glass substrate. This lapping step was performed using a double-side lapping device.

(2) Shape Processing Step

Next, a cylindrical grindstone was used to create a hole in the central portion of the glass substrate and an outer circumferential edge surface was ground to have a diameter of 65 mmφ, whereafter predetermined chamfering was performed on the outer circumferential edge surface and an inner circumferential edge surface.

(3) Precision Lapping Step

This precision lapping step was performed using a double-side lapping device.

(4) Edge Surface Polishing Step

Next, the edge surfaces (inner and outer circumferential edge surfaces) of the glass substrate were polished by brushing while the glass substrate was rotated. After undergoing the above-described edge surface polishing, the surfaces of the glass substrate were cleaned.

(5) Main Surface Polishing Step

Next, the main surface polishing step was performed using a double-side polishing device. In the double-side polishing device, the glass substrate that is held by a carrier is tightly placed between the upper and lower surface plates to which polishing pads are attached, the carrier is engaged with the sun gear and the internal gear, and the glass substrate is pressed between the upper and lower surface plates. Then, a polishing liquid is supplied between the polishing pads and the glass substrate surfaces to be polished, the upper and lower surface plates are rotated, and thus the glass substrate revolves while rotating on the surface plates so that both surfaces of the glass substrate are polished simultaneously. Specifically, the polishing step was performed using a hard polisher (hard urethane foam) as a polisher. A liquid in which cerium oxide was dispersed as an abrasive was used as the polishing liquid. After undergoing the above-described polishing step, the glass substrate was cleaned and dried.

(6) Chemical Strengthening Step

Next, after undergoing the above-described cleaning, the glass substrate was subjected to the chemical strengthening. Chemical strengthening was performed by preparing a chemical strengthening liquid obtained by mixing potassium nitrate and sodium nitrate, heating this chemical strengthening liquid to 380° C., and immersing the glass substrate that was cleaned and dried in the heated chemical strengthening liquid for approximately 4 hours.

(7) Main Surface Finishing-Polishing Step

Next, the finishing-polishing step was performed using the same double-side polishing device that was used in the above-described main surface polishing step, and polishing pads (polyurethane foam) with a soft polisher (suede) were used instead as the polisher. This finishing-polishing step is mirror-polishing processing for finishing the main surfaces of the glass substrate to smooth mirror surfaces each having a surface roughness Ra of about 0.2 nm or less, for example, while maintaining the flat surfaces obtained in the initial polishing step described above. A liquid in which colloidal silica (average particle diameter (D50): 18 nm) was dispersed in water was adjusted to be acidic (pH is about 4) and used as the polishing liquid. After undergoing the above-described finishing-polishing step, the glass substrate was cleaned using ultrapure water and dried. Here, when surface roughnesses of the main surfaces of the glass substrate were checked using an AFM, the main surfaces each had a Ra of 0.18 nm.

(8) Main Surface Final Finishing-Polishing Step

A polishing liquid was prepared by adding, as polishing abrasive particles, 1 wt % organic-based particles that had a particle diameter of 1.3 μm and were made of a styrene resin as a raw material to water, and adjusting the mixture to have a pH of 4 to 8. The polishing step was performed with a polishing method similar to that of the above-described finishing-polishing step. The polishing time was set to 1 hour. After undergoing the above-described final finishing-polishing step, the glass substrate was cleaned and dried. It should be noted that here, cleaning was performed through only immersion in water (ultrapure water), without applying ultrasound during the immersion.

A glass substrate (Working Example 1) having very smooth surfaces was obtained through the above-described steps. When surface roughnesses of main surfaces of the glass substrate were measured with an atomic force microscope (AFM), the glass substrate had a Ra of 0.080 nm.

It should be noted that the obtained glass substrate had an outer diameter of 65 mm, an inner diameter of 20 mm, and a substrate thickness of 0.8 mm.

Also, a magnetic-disk glass substrate (Working Example 2) was obtained by performing final finishing-polishing, similarly to Working Example 1 above, except that the polishing abrasive particles used in the above-described main surface final finishing-polishing step were changed to organic-based particles made of an acrylic resin having a particle diameter of 1.5 μm as a raw material.

Also, a magnetic-disk glass substrate (Working Example 3) was obtained by performing final finishing-polishing, similarly to Working Example 1 above, except that the polishing abrasive particles used in the above-described main surface final finishing-polishing step were changed to organic-based particles made of a urethane resin having a particle diameter of 2.0 μm as a raw material.

Also, a magnetic-disk glass substrate (Comparative Example 1) was obtained by performing final finishing-polishing, similarly to Working Example 1 above, except that polishing abrasive particles used in the above-described main surface final finishing-polishing were changed to colloidal silica abrasive particles having a particle diameter (D50) of 0.010 μm.

Also, a magnetic-disk glass substrate (Comparative Example 2) was obtained by performing final finishing-polishing similarly to Working Example 1 above, except that polishing abrasive particles used in the above-described main surface final finishing-polishing step were changed to composite particles of silica and acrylic resin particles having a particle diameter of 2.0 μm.

With regard to the magnetic-disk glass substrates obtained in Working Examples 2 and 3, and Comparative Examples 1 and 2, surface roughnesses of the main surfaces were also measured similarly to the above, and the results are collectively shown in Table 1 below along with Working Example 1.

TABLE 1

|  | Type of final finishing-polishing abrasive particles | Particle diameter (μm) | Ra (nm) |
|---|---|---|---|
| Work. Ex. 1 | styrene | 1.3 | 0.080 |
| Work. Ex. 2 | acrylic resin | 1.5 | 0.088 |
| Work. Ex. 3 | urethane | 2.0 | 0.10 |
| Comp. Ex. 1 | silica | 0.010 | 0.39 |
| Comp. Ex. 2 | composite particle of silica and acrylic resin | 2.0 | 0.15 |

As is understood from the results in Table 1 above, by performing the final finishing-polishing using a polishing liquid in which the organic-based particles are used as polishing abrasive particles, it is possible to reduce the surface roughnesses of the main surfaces more than with currently available methods, and to obtain a glass substrate having a very smooth surface with a Ra of approximately 0.08 to 0.10 nm, for example.

In contrast, when the final finishing-polishing is performed using colloidal silica, which is more minute than the particles used in the finishing-polishing (Comparative Example 1), the surface roughnesses of the main surfaces increase, and it is ultimately not possible to reduce the Ra to 0.1 nm or less. It is inferred that in the case of silica abrasive particles, if the particle diameter is reduced excessively, it will be difficult to perform uniform polishing processing. Also, as shown in Comparative Example 2 of Table 1, a similar case occurs when composite particles of silica and acrylic resin are used, and it is ultimately not possible to reduce the Ra to 0.1 nm or less.

Next, with regard to the magnetic-disk glass substrate obtained when the particle diameter of the organic-based particles obtained by using an acrylic resin as the raw material in Working Example 2 above was changed, the surface roughnesses of the main surfaces were measured similarly to the above, and the results are collectively shown in Table 2 below.

TABLE 2

| Particle diameter (μm) | Ra (μm) |
|---|---|
| 0.5 | 0.095 |
| 0.8 | 0.093 |
| 1.5 | 0.088 |
| 3.0 | 0.087 |
| 5.0 | 0.086 |
| 9.0 | 0.085 |
| 10 | 0.083 |
| 15 | 0.080 |
| 20 | 0.081 |
| 25 | 0.083 |
| 30 | 0.090 |
| 50 | 0.094 |
| 60 | 0.095 |

As is understood from the results in Table 2 above, it is preferable to use organic-based particles having a particle diameter of 0.5 to 60 μm, the organic-based particles being used as polishing abrasive particles in final finishing-polishing and being obtained by using an acrylic resin as the raw material. In the present invention, in order to achieve a further reduction in surface roughness, it is preferable to use the organic-based particles having a particle diameter of 1.5 to 30 μm, and more preferably having a particle diameter of 10 to 25 μm. It is understood from the results in Table 2 above that use of organic-based particles having a particle diameter of 1.5 to 30 μm makes it possible to reduce the Ra to 0.09 nm or less, and use of organic-based particles having a particle diameter of 10 to 25 μm makes it possible to further reduce the Ra to less than 0.085 nm.

Next, water (ultrapure water) cleaning, acid (sulfuric acid) cleaning, alkali (potassium hydroxide) cleaning, or alcohol (ethanol, methanol) cleaning was performed as a cleaning method after final finishing-polishing ends in Working Example 2 above, and after cleaning the magnetic-disk glass substrate, surface roughnesses (Ra and Rp) of the main surfaces were measured similarly to the above, and the results are collectively shown in Table 3 below.

In addition, the number of defects resulting from foreign matter adhering to main surfaces of a glass substrate after cleaning was counted using a 1 μm×1 μm image obtained with an AFM, and the results are also shown in Table 3. It should be noted that here, cleaning was performed by applying ultrasound in a state in which a glass substrate is immersed in a cleaning liquid.

TABLE 3

| Type of final finishing-polishing abrasive particles | Cleaning liquid | Ra (nm) | Rp (nm) | Number of foreign matter adherence defects (count number) |
|---|---|---|---|---|
| acrylic resin | ultrapure water | 0.10 | 0.67 | 18 |
| acrylic resin | sulfuric acid | 0.17 | 0.94 | 0 |
| acrylic resin | potassium hydroxide | 0.12 | 0.74 | 0 |
| acrylic resin | ethanol | 0.09 | 0.55 | 0 |
| acrylic resin | methanol | 0.09 | 0.54 | 0 |

As shown in Table 3 above, with regard to the effect that the cleaning methods, which were performed after the final finishing-polishing was performed using organic-based particles as polishing abrasive particles, has on the surface roughness of a glass substrate after cleaning, only with ultrapure water cleaning did the surface roughness after cleaning slightly increase, and defects resulting from foreign matter adherence occur. Also, with acid cleaning and alkaline cleaning, foreign matter adherence defects were not confirmed, but compared to ultrapure water cleaning, it was confirmed that surface roughness after cleaning increased significantly. In contrast to these cleaning methods, with alcohol cleaning, surface roughness after cleaning increased less than with ultrapure water cleaning, and foreign matter adherence defects were not confirmed. That is, it can be understood that alcohol cleaning is optimal as a cleaning method performed after the final finishing-polishing is performed using organic-based particles as polishing abrasive particles. Also, with regard to the case where the urethane resin particles and styrene resin particles are used as polishing abrasive particles, as Working Examples 1 and 3, when an experiment similar to that in the case of the above-described acrylic resin particles was performed, it was confirmed that the surface roughness after cleaning increased very slightly with alcohol cleaning, and foreign matter adherence defects did not occur, and effects similar to those in the case of the acrylic resin particles were confirmed.

Next, the processing time for final finishing-polishing required to make Ra 0.1 nm or less when surface roughnesses of glass substrates that had not undergone the final finishing-polishing (that is, the surface roughnesses before the substrates were subjected to the final finishing-polishing) in Working Example 2 above were changed (Working Examples 11 to 15) were measured, and the results are collectively shown in Table 4 below. It should be noted that the surface roughnesses of glass substrates that had not undergone the final finishing-processing were changed by adjusting the average particle diameter of colloidal silica abrasive particles used in the finishing-polishing prior to the final finishing-polishing in a range of 15 nm or more. In the case where the average particle diameter is 15 nm or more, if the average particle diameter increases, the surface roughness after polishing increases. Also, Table 4 shows the processing time for the final finishing-polishing required to make Ra 0.1 nm or less as a ratio obtained using 1 as the processing time of Working Example 11.

TABLE 4

| | Surface roughness Ra (nm) of substrate before final finishing-polishing | Ratio of processing time required to make Ra 0.1 nm or less |
|---|---|---|
| Work. Ex. 11 | 0.15 | 1.00 |
| Work. Ex. 12 | 0.20 | 1.10 |
| Work. Ex. 13 | 0.25 | 1.50 |
| Work. Ex. 14 | 0.30 | 2.00 |
| Work. Ex. 15 | 0.40 | 5.00 |

The surface roughness of a glass substrate prior to being subjected to the final finishing-polishing greatly influences the processing time for the final finishing-polishing in which a polishing liquid containing the organic-based particles of the present invention as polishing abrasive particles is used. It is understood from the results in Table 4 above that with regard to the roughnesses of main surfaces of a glass substrate prior to being subjected to final finishing-polishing, if the arithmetic mean roughness Ra is 0.3 nm or less, it is possible to further reduce the surface roughness of the substrate in a relatively short processing time by polishing processing in which the organic-based particles of the present invention are used as the polishing abrasive particles, and thereby finish the substrate to have a Ra of 0.1 nm or less. If the roughness Ra of the main surface of a glass substrate prior to being subjected to the final finishing-polishing is 0.4 nm or more, the final finishing-polishing of the present invention will take a long time. That is, from the point of view of processing time (productivity), with regard to the roughnesses of main surfaces of a glass substrate before the main surfaces of the glass substrate are mirror-polished using a polishing liquid containing the organic-based particles of the present invention as polishing abrasive particles, the arithmetic mean roughness Ra is preferably 0.3 nm or less, and more preferably 0.2 nm or less.

(Manufacturing Magnetic Disk)

A magnetic disk for perpendicular magnetic recording was obtained by performing the following film forming step on the magnetic-disk glass substrate obtained in Working Example 1 above.

Specifically, an adherent layer constituted by a Ti-based alloy thin film, a soft magnetic layer constituted by a CoTaZr alloy thin film, a base layer constituted by a Ru thin film, a perpendicular magnetic recording layer made of a CoCrPt alloy, a carbon protective layer, and a lubricant layer were sequentially formed on the glass substrate. The protective layer is for preventing degradation of the magnetic recording layer caused by contact with the magnetic head, and the protective layer is composed of hydrogenated carbon and yields wear resistance. Also, the lubricant layer was formed by a dipping method using an alcohol-modified perfluoropolyether liquid lubricant.

With regard to the obtained magnetic disks, the result of testing glide properties on the entire magnetic disk, using a DFH head, such that a gap between an element portion of the magnetic head and the magnetic disk surface is 1 nm, was such that head crash, contact with a protruding portion on the main surfaces, and the like did not occur and favorable results were obtained. This indicates that the main surfaces of the magnetic disk were polished to have a very low roughness and a very clean surface was obtained.

The invention claimed is:

1. A method for manufacturing a glass substrate, comprising:
    mirror-polishing main surfaces of the glass substrate using a polishing liquid containing polishing abrasive particles consisting of organic-based particles, the organic-based particles being made of an organic material which has a lower hardness than that of the glass substrate and has elasticity.

2. The method for manufacturing the glass substrate according to claim 1, wherein
    the organic-based particles are made of a styrene-based resin, an acryl-based resin, or a urethane-based resin.

3. The method for manufacturing the glass substrate according to claim 1, wherein
    a particle diameter of the organic-based particles is in a range of 0.5 to 60 μm.

4. The method for manufacturing the glass substrate according to claim 1, further comprising
    polishing the main surfaces of the glass substrate using a polishing liquid containing silica abrasive particles as polishing abrasive particles, wherein
    the main surfaces of the glass substrate are mirror-polished using the polishing liquid containing the polishing abrasive particles consisting of the organic-based particles after the main surfaces of the glass substrate are polished using the polishing liquid containing the silica abrasive particles as the polishing abrasive particles.

5. The method for manufacturing the glass substrate according to claim 1, wherein with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

6. The method for manufacturing the glass substrate according to claim 1, wherein
after the main surfaces of the glass substrate are mirror-polished using the polishing liquid containing the polishing abrasive particles consisting of the organic-based particles, the glass substrate is cleaned using an alcohol-based cleaning agent.

7. The method for manufacturing the glass substrate according to claim 1, wherein
the glass substrate is a magnetic-disk glass substrate.

8. The method for manufacturing a glass substrate according to claim 1, wherein
the glass substrate is a glass substrate for a mask blank.

9. A method for manufacturing a magnetic disk, in which
at least a magnetic layer is formed on a magnetic-disk glass substrate that is obtained with the manufacturing method according to claim 7.

10. The method for manufacturing the glass substrate according to claim 2, wherein
a particle diameter of the organic-based particles is in a range of 0.5 to 60 μm.

11. The method for manufacturing the glass substrate according to claim 2, further comprising
polishing the main surfaces of the glass substrate using a polishing liquid containing silica abrasive particles as polishing abrasive particles, wherein
the main surfaces of the glass substrate are mirror-polished using the polishing liquid containing the polishing abrasive particles consisting of the organic-based particles after the main surfaces of the glass substrate are polished using the polishing liquid containing the silica abrasive particles as the polishing abrasive particles.

12. The method for manufacturing the glass substrate according to claim 3, further comprising
polishing the main surfaces of the glass substrate using a polishing liquid containing silica abrasive particles as polishing abrasive particles, wherein
the main surfaces of the glass substrate are mirror-polished using the polishing liquid containing the polishing abrasive particles consisting of the organic-based particles after the main surfaces of the glass substrate are polished using the polishing liquid containing the silica abrasive particles as the polishing abrasive particles.

13. The method for manufacturing the glass substrate according to claim 10, further comprising
polishing the main surfaces of the glass substrate using a polishing liquid containing silica abrasive particles as polishing abrasive particles, wherein
the main surfaces of the glass substrate are mirror-polished using the polishing liquid containing the polishing abrasive particles consisting of the organic-based particles after the main surfaces of the glass substrate are polished using the polishing liquid containing the silica abrasive particles as the polishing abrasive particles.

14. The method for manufacturing the glass substrate according to claim 2, wherein
with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

15. The method for manufacturing the glass substrate according to claim 3, wherein
with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

16. The method for manufacturing the glass substrate according to claim 4, wherein
with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

17. The method for manufacturing the glass substrate according to claim 10, wherein
with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

18. The method for manufacturing the glass substrate according to claim 11, wherein
with regard to roughnesses of the main surfaces of the glass substrate before the main surfaces of the glass substrate are mirror-polished using the polishing liquid containing the polishing abrasive particles consisting of the organic-based particles, an arithmetic mean roughness Ra is 0.3 nm or less.

* * * * *